United States Patent [19]

Enoshima et al.

[11] 4,382,429
[45] May 10, 1983

[54] SPARK TIMING SYSTEM FOR SPARK IGNITION INTERNAL COMBUSTION ENGINE

[75] Inventors: Toshio Enoshima, Fujisawa; Shoji Furuhashi; Hideyuki Tamura, both of Yokohama, all of Japan

[73] Assignee: Nissan Motor Company, Limited, Yokohama, Japan

[21] Appl. No.: 227,639

[22] Filed: Jan. 23, 1981

[30] Foreign Application Priority Data

Jan. 31, 1980 [JP] Japan ................. 55-9377

[51] Int. Cl.³ .................................................. F02P 5/04
[52] U.S. Cl. ....................................... 123/425; 123/427
[58] Field of Search ....................... 123/425, 427; 73/35

[56] References Cited

U.S. PATENT DOCUMENTS

| | | | |
|---|---|---|---|
| 4,002,155 | 1/1977 | Harned et al. | 123/425 |
| 4,100,895 | 7/1978 | Hattori et al. | 123/427 |
| 4,133,475 | 1/1979 | Harned et al. | 123/425 |
| 4,211,194 | 7/1980 | Hattori et al. | 123/427 X |
| 4,242,995 | 1/1981 | Schramm et al. | 123/425 |
| 4,282,841 | 8/1981 | Takagi et al. | 123/425 |

Primary Examiner—Tony M. Argenbright
Attorney, Agent, or Firm—Lane, Aitken & Kananen

[57] ABSTRACT

A spark timing adjusting circuit receives a basic spark timing signal from a spark timing determining circuit and regulates the spark timing according to a knocking signal from a knocking detector. A speed changing circuit serves to increase the rate of advance of the spark timing after the spark timing has been retarded when the operational state of the engine is in a first predetermined range corresponding to a first speed range in which all the engine speeds are lower than a first predetermined value. The speed changing circuit may include a circuit which decreases the rate of retard of the spark timing when the operational state of the engine is in a second predetermined range corresponding to a second speed range in which all the engine speeds are higher than a second predetermined value which is higher than the first predetermined value, thereby avoiding rapid retardation of the spark timing. Alternatively, the first and second predetermined ranges of the operational state of the engine may be defined with respect to intake manifold vacuum, throttle valve opening or intake air amount to the engine.

37 Claims, 17 Drawing Figures

SPARK TIMING SYSTEM FOR SPARK IGNITION INTERNAL COMBUSTION ENGINE

BACKGROUND OF THE INVENTION

The present invention relates to a spark timing system for a spark ignition internal combustion engine which, when knocking occurs, retards the spark timing to suppress the knocking, and more particularly to a spark timing system of the above type which varies the rate of regulation of the spark timing according to the operational state of the engine.

SUMMARY OF THE INVENTION

The present invention provides a spark timing system for a spark ignition internal combustion engine which comprises of a spark timing adjusting means receiving a basic spark timing signal from a spark timing determining means and regulating the spark timing according to a knocking signal from a knocking detecting means. Speed changing means responds to the operational state of the engine to vary the rate at which the spark timing is regulated.

The speed changing means serves to increase the rate of advance of the spark timing after the spark timing has been retarded when the operational state of the engine is in a first predetermined range corresponding to a first speed range in which all the engine speeds are lower than a first predetermined value. Thus, when the engine speed falls from a higher speed than the predetermined speed to its idling speed, sparking is securely effected at correct timing, thereby preventing the engine speed from falling below idling speed and hence the engine from stalling.

Increasing the rate of advance of the spark timing is effected by decreasing a discharge time constant of a circuit of the spark timing adjusting means including a capacitor which is charged and discharged according to the presence or absence, respectively, of a knocking signal.

The speed changing means may serve to increase the charge time constant of the circuit including the capacitor when the operational state of the engine is in a second predetermined range corresponding to a second speed range in which all the engine speeds are higher than a second predetermined value which is higher than the first predetermined value. This decreases the rate of retard of the spark timing when the operational state of the engine is in the second predetermined range, thereby avoiding rapid retardation of the spark timing. This prevents the driving of the vehicle from being impaired although knocking occurs when the engine speed is relatively high and the engine output torque is relatively large, i.e. the engine load is relatively high.

Alternatively, the first and second predetermined ranges of the operational state of the engine may be defined with respect to the intake manifold vacuum, the throttle valve opening or the intake air amount to the engine.

BRIEF DESCRIPTION OF THE DRAWINGS

Objects, features and advantages of the present invention will be apparent from the following description of embodiments thereof, taken in conjunction with the accompanying drawings in which the same reference numerals and characters designate corresponding elements and in which.

DETAILED DESCRIPTION OF THE PREFERRED EMBODIMENTS

Figure 1:
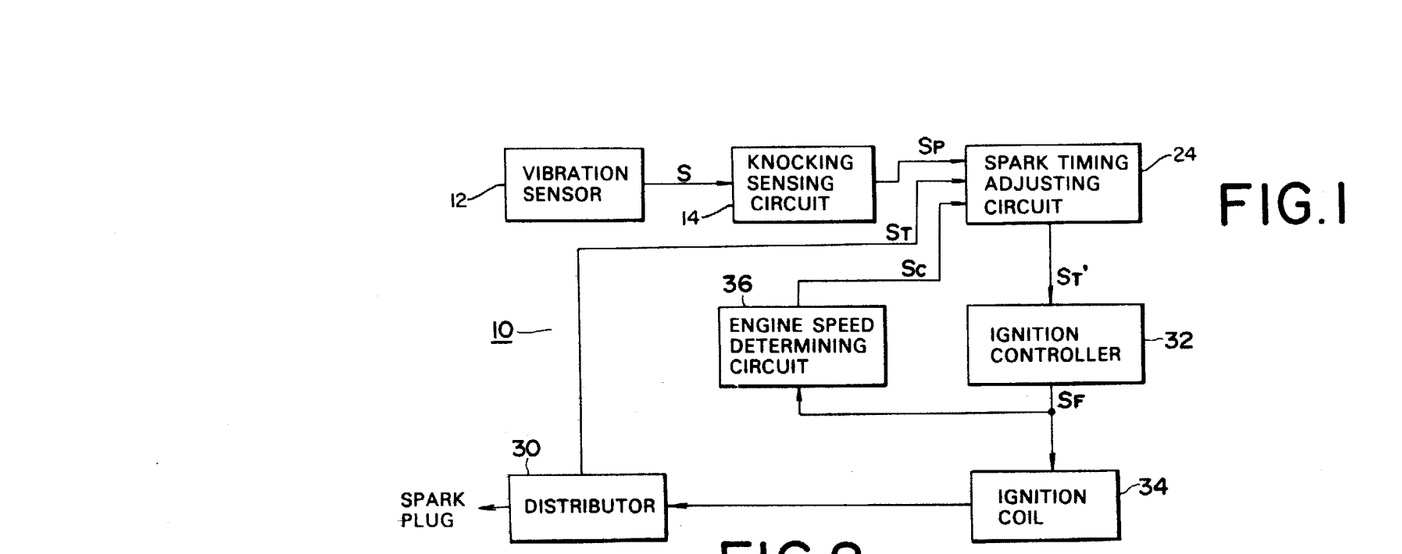
FIG. 1 is a block diagram of a preferred embodiment of a spark timing system according to the present invention.
Figure 2:
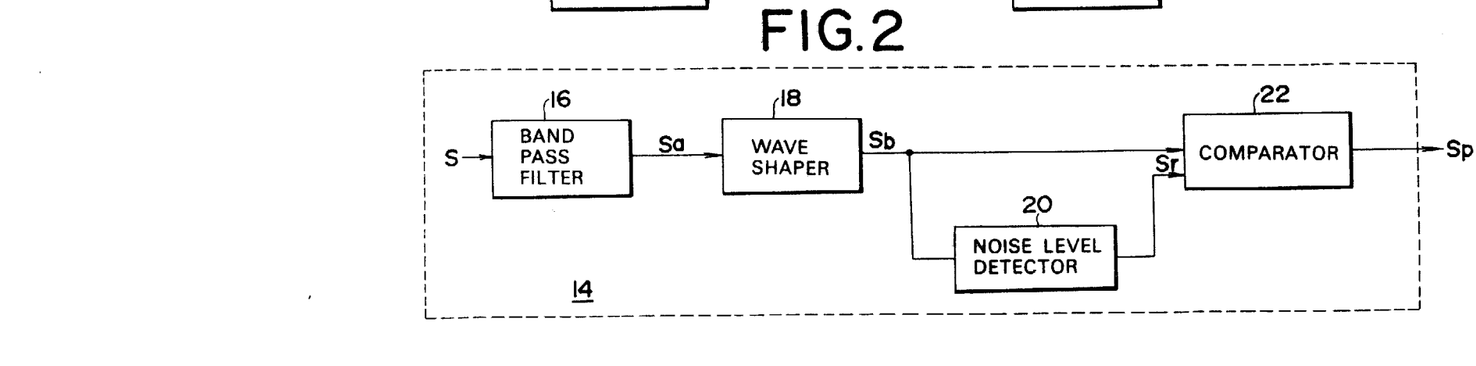
FIG. 2 is a block diagram of the knocking sensing circuit shown in FIG. 1.
Figure 3:
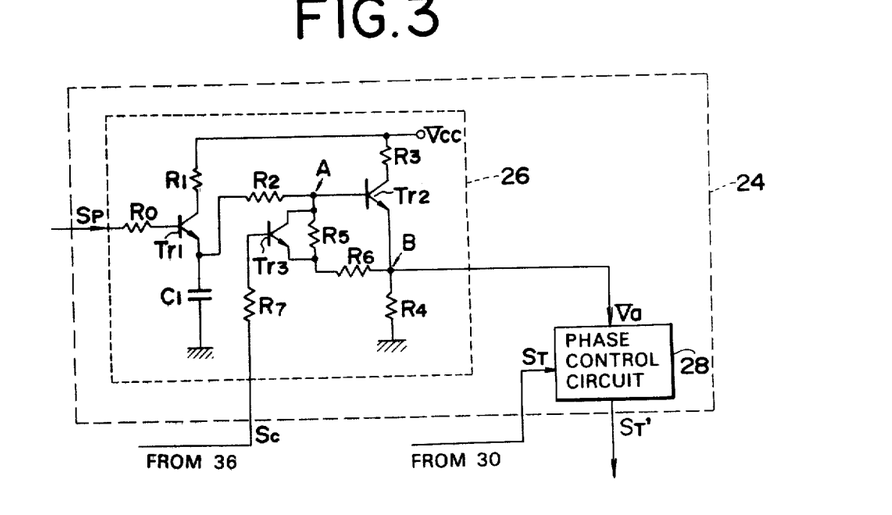
FIG. 3 is a circuit diagram of the spark timing adjusting circuit shown in FIG. 1.

In FIGS. 1, 2 and 3, a preferred embodiment of a spark timing system for a spark ignition internal combustion engine according to the present invention is shown generally designated by 10. The system includes a vibration sensor 12 which may include a magnetostrictive element or a piezoelectric element and which may be fixed to the cylinder block, cylinder head or intake manifold of the engine to sense vibrations of the engine.

Figure 4:
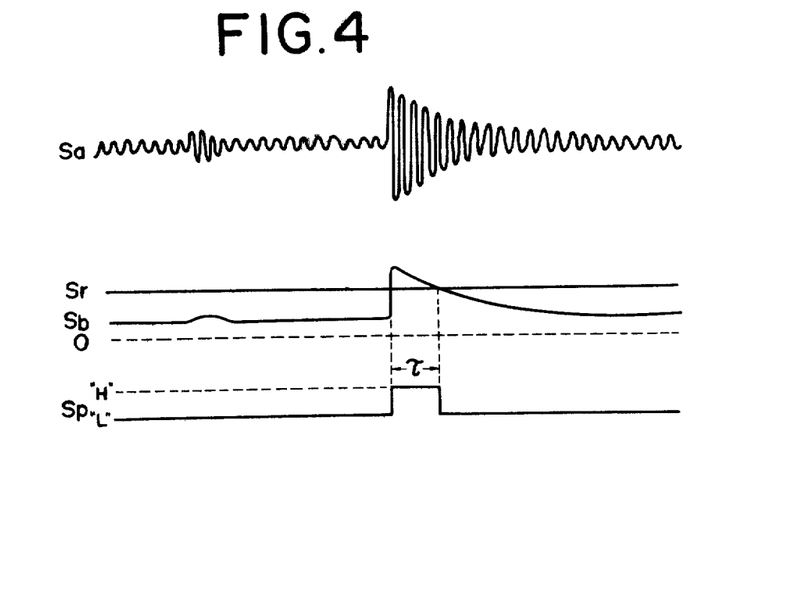
FIG. 4 is a timing chart of the knocking sensing circuit.

The system further includes a knocking sensing circuit 14 which selects knocking components greater in magnitude than a predetermined level from the output of the vibration sensor 12. The knocking sensing circuit 14 comprises a band pass filter 16 which may have a central frequency of for example 7 KHz and a Q ($=f_0/2\Delta f$) of 10, where $f_0$ is the central frequency and $\Delta f$ is the band width of the filter, so that part of the output signal S of the vibration sensor 12 is allowed to pass the filter 16, i.e. a signal Sa as shown in FIG. 4, substantially in the range of 5 to 10 KHz. Typically, the knocking frequency is substantially included in the range of 5 to 10 KHz although this may depend on the configuration and temperature of the engine combustion chamber. The knocking sensing unit further includes a wave shaper 18 which rectifies and amplifies the envelope of the signal Sa from the filter 16. The wave shaper may perform either full wave or half wave rectification of the signal Sa.

The knocking sensing circuit 14 further includes a noise level sensor 20 which averages the signal Sb from the wave shaper 18 over a fixed time interval in which no knocking occurs, such as directly after sparking, or in the vicinity of top dead centre, and amplifies the averaged signal with a suitable amplification factor to provide a substantially constant background noise level, shown as Sr in FIG. 4, which represents vibrations not relating to knocking. Alternatively, the noise level sensor 20 may detect, hold and, with an appropriate amplification factor, amplify the peak value of the signal Sb for a fixed period of time in which no knocking occurs.

The knocking sensing circuit 14 includes a comparator 22 which compares the reference signal Sr from the noise level sensor 20 with the output Sb from the wave shaper 18 and produces a high level pulse output shown as Sp in FIG. 2, when Sb is greater in magnitude than Sr. The duration $\tau$ of the pulse output Sp corresponds to the magnitude of knocking.

The spark timing system 10 further comprises a spark timing adjusting circuit 24 which in turn comprises an integrating circuit 26. This integrating circuit includes a first NPN transistor $Tr_1$, an input resistor $R_0$ connecting the output of the comparator 22 to the base of the transistor $Tr_1$, a load resistor $R_1$ connecting the collector of the transistor $Tr_1$ to a power supply Vcc, a capacitor $C_1$ connecting the emitter of the transistor $Tr_1$ to ground, a second NPN transistor $Tr_2$, an input resistor $R_2$ connecting the emitter of the first transistor $Tr_1$ to the base of the second transistor $Tr_2$, a load resistor $R_3$ connecting the collector of the second transistor to the power supply Vcc, a resistor $R_4$ connecting the emitter of the transistor $Tr_2$ to ground, and series connected resistors $R_5$ and $R_6$ connecting the base and emitter of the second transistor $Tr_2$, a third NPN transistor $Tr_3$ whose collector and emitter are connected across the resistor $R_5$, and an input resistor $R_7$ connecting the base of the transistor $Tr_3$ to an operational state determining circuit such as an engine speed determining circuit to be mentioned later in more detail.

Figure 5:
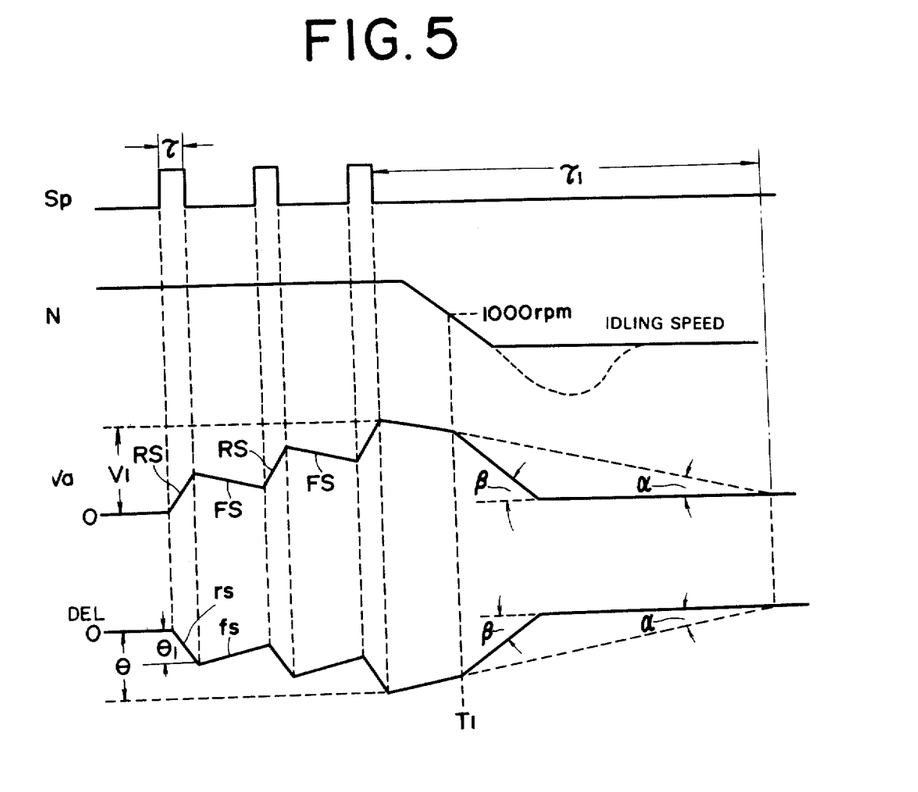
FIG. 5 is a timing chart of the system shown in FIG. 1.

The first transistor $Tr_1$ is turned on for a time interval $\tau$ corresponding to the magnitude of the knocking by the signal Sp from the comparator 22 of the knocking sensor 14, as shown in FIG. 5. The capacitor $C_1$ is charged from the power supply Vcc only for the interval $\tau$ with a relatively small time constant $R_1 \cdot C_1$. The second transistor $Tr_2$ is switched on according to the voltage level at a point A which divides the voltage across the capacitor $C_1$ by the resistors $R_2$ and $(R_5+R_6+R_4)$ so that the voltage Va corresponding to that of the capacitor is outputted from a point B or the emitter of the transistor $Tr_2$. The voltage across the capacitor $C_1$ gradually discharges through the resistors $R_2$, $R_5$, $R_6$ and $R_4$ when the comparator 22 produces a zero output, thereby turning off the transistor $Tr_1$, and the output Va of the integrating circuit 26 gradually decreases. Accordingly, the magnitude of the voltage, as shown by Va in FIG. 5, is proportional to the duration and frequency of knocking. The rising speed, represented by an upward oblique line segment RS, of the voltage Va is determined by the charge time constant $R_1 \cdot C_1$ of the integrating circuit 26 and the falling speed of the voltage Va, represented by a downward oblique line segment FS, is determined by the discharge time constant $(R_2+R_5+R_6+R_4) \cdot C_1$ or $(R_2+R_6+R_4) \cdot C_1$. These discharge time constants are relatively large so that the capacitor $C_1$ is charged to the voltage corresponding to the magnitude of knocking and holds the voltage for a relatively long time during which the transistor $Tr_1$ is off. A transistor $Tr_3$ is provided so as to short-circuit the resistor $R_5$ when it receives a drive signal Sc from an engine speed determining circuit 36.

A phase control circuit 28 in the spark timing adjusting circuit 24 adjusts the phase of a crankshaft angle reference signal $S_T$ from a distributor 30 according to the output voltage Va of the integrating circuit 26 to generate an adjusted spark timing signal $S_T{'}$ which is sent to an ignition controller 32. More particularly, the phase control circuit 28 effects a retard angle control to the spark timing with a constant spark timing adjustment speed (represented by the downward line segments rs of the curve DEL in FIG. 5), corresponding to the rising of the output voltage Va, as shown by the curve Va in FIG. 3, of the integrating circuit 26 corresponding to the duration $\tau$ of the pulse signal Sp from the comparator 22, thereby retarding the phase of the timing signal $S_T$ by a retard angle $\theta_1$, as shown in FIG. 5, during the time period $\tau$. On the other hand, while the pulse signal Sp is absent, the accumulated amount of retard angle decreases at a constant spark timing adjustment speed (as represented by upward oblique line segments fs of the curve DEL of FIG. 5) corresponding to the speed at which the voltage Va gradually decreases, as shown by FS. Thus the accumulated amount of retard angle reduces to zero after Q time $\tau_1$ determined by the discharge time constant $(R_2+R_5+R_6+R_4) \cdot C_1$ unless any pulse signal Sp from the comparator 22 is thereafter inputted to the integrating circuit 26. If knocking occurs again before the time $\tau_1$ has passed, the phase of the timing signal $S_T{'}$ is delayed by the sum of the retard angle corresponding to the knocking which has just occurred plus the remaining accumulated amount of retard angle.

The ignition controller 32 determines a dwell angle according to the adjusted timing signal from the phase control circuit 28 and controls the supply of electric current to an ignition coil 34 such that a spark is produced at the adjusted timing signal from the phase control circuit 28 and is supplied through the distributor 30 and the respective spark plugs of the engine cylinders in such a way as to restrain or avoid the occurrence of knocking.

Figure 6:
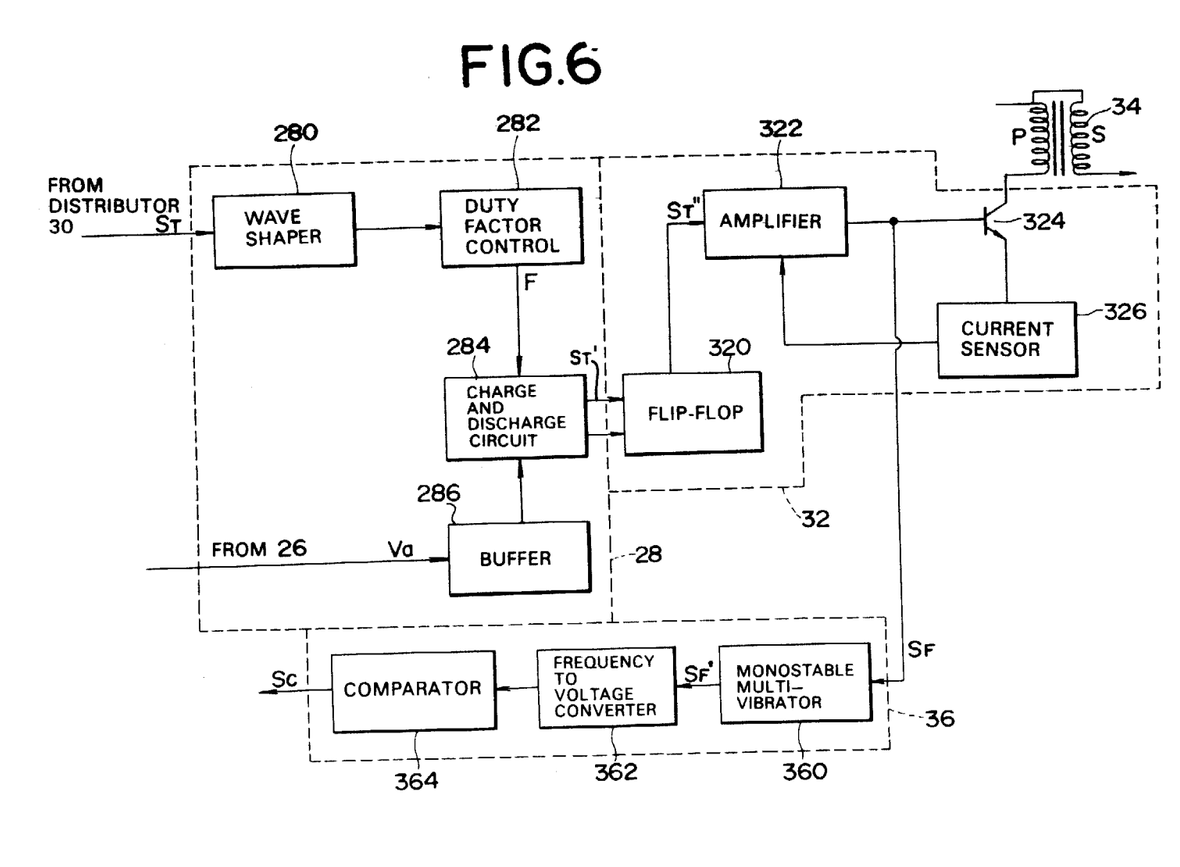
FIG. 6 is a block diagram of the phase control circuit, ignition controller, and engine speed determining circuit.
Figure 7:
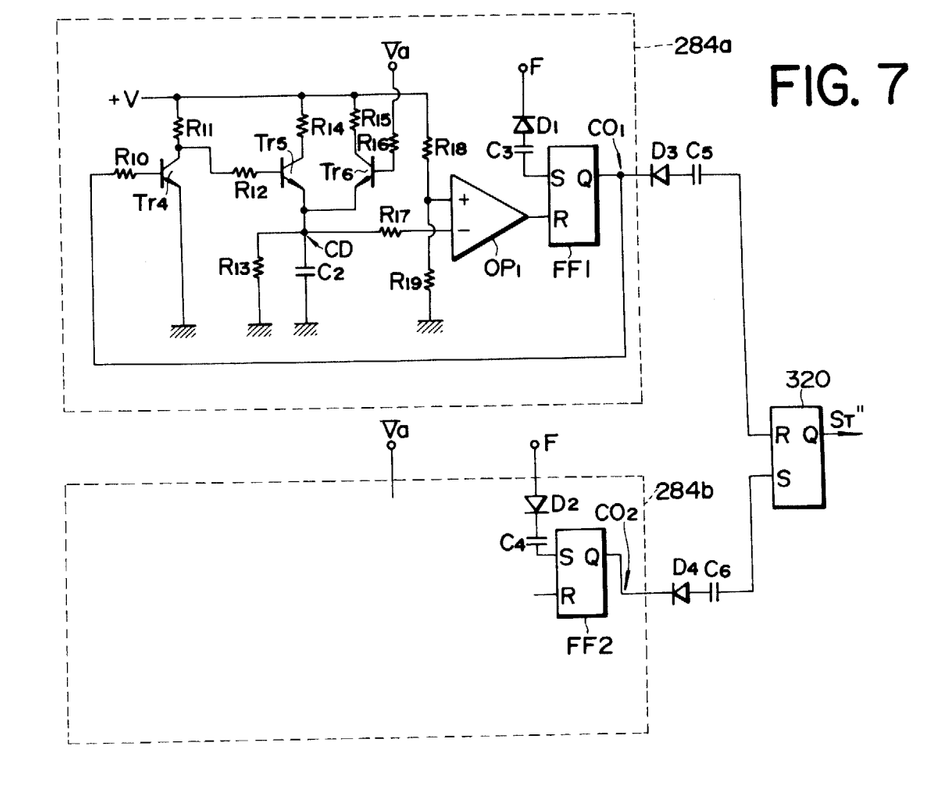
FIG. 7 is a circuit diagram of the charge and discharge circuit of FIG. 6.
Figure 8:
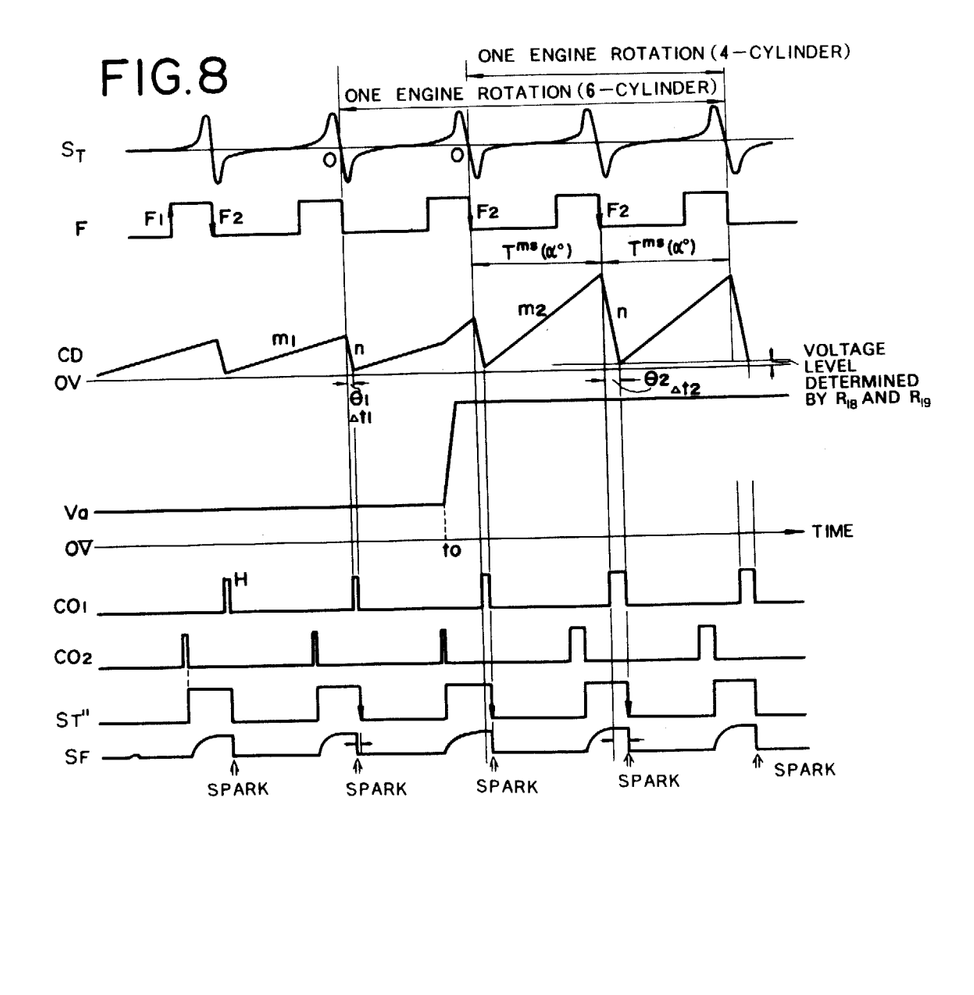
FIG. 8 is a timing chart of the phase control circuit and ignition controller of FIG. 7.

Further details of the structure and operation of the phase control circuit 28 and the ignition controller 32 are shown in FIGS. 6, 7 and 8. The crankshaft angle reference signal $S_T$, which is a basic signal determined from governor and vacuum advance angles, is produced once every 180° rotation of the crankshaft in the case of a 4-cylinder engine (once every 120° rotation of the crankshaft in the case of a 6-cylinder engine). The angle reference signal $S_T$ is shaped by a wave shaper 280 into a signal having regular rectangular pulses which are adjusted in pulse width by a duty factor control circuit 282, as shown by F in FIG. 8, depending on the rotational speed of the crankshaft and the voltage of the power source. The pulses of the signal F have a constant width and their negative-going edges $F_2$ occur at the downward zero crossing points 0 of the signal $S_T$. The output F of the duty factor control circuit 282 is applied to a pair of sub-circuits 284a and 284b constituting a charge and discharge circuit 284. More particularly, as for one sub-circuit 284a, the output F of the duty factor control circuit 284 is inputted through a series circuit of a diode $D_1$ and a capacitor $C_3$ to the set input of a flip-flop $FF_1$ of the sub-circuit 284a. The flip-flop $FF_1$ is set by the negative-going edge $F_2$ of the signal F and reset by the signal from a comparator $OP_1$ to produce a signal shown by $CO_1$ in FIG. 8. When the signal $CO_1$ is low, a transistor $Tr_4$ is turned off through a resistor $R_{10}$ and a transistor $Tr_5$ is turned on through resistors $R_{11}$ and $R_{12}$ by the power supply $+V$. Thus a capacitor $C_2$ is charged through a resistor $R_{14}$ and the transistor Tr5 and the charged voltage across the capacitor $C_2$ is shown by a gradient $m_1$ in FIG. 8. When the Q output of the flip-flop $FF_1$ is high, the transistor $Tr_4$ is turned on and the transistor $Tr_5$ is turned off. Thus, the capacitor $C_2$ is no longer charging and begins to discharge through a resistor $R_{13}$, with the discharging curve being shown by the gradient n in FIG. 8. The output of the comparator $OP_1$ goes high when the potential across the capacitor $C_2$, as shown by the wave form CD in FIG. 8, falls below the voltage level of the inverting input of the comparator $OP_1$ determined by resistors $R_{18}$ and $R_{19}$ and resets the flip-flop 1.

Normally, the above operation is repeated, but when knocking occurs, the output voltage Va of the integrating circuit 26 increases at a time $t_0$, for example as shown by Va in FIG. 8. The wave form of Va in FIG. 8 is shown different from that of Va in FIG. 5 for the purpose of facilitating description. Thus, a transistor $Tr_6$, in FIG. 7, constituting a buffer 286 of FIG. 6, is turned on through a resistor $R_{16}$. The capacitor $C_2$ is charged through a resistor $R_{15}$ and transistor $Tr_6$ by the power supply +V with an electric current proportional to the output voltage Va and is also charged through the transistor $Tr_5$ and the resistor $R_{14}$ by the power supply +V, with the charging waveform being shown by the gradient $m_2$ in FIG. 8. As the voltage across the capacitor $C_2$ increases, the time required to discharge the capacitor $C_2$ to any desired value increases, as will be seen from comparison of the discharge time durations $\Delta t_1$ and $\Delta t_2$, as shown in FIG. 8. These discharge times correspond to delays from the zero crossing points of the crankshaft angle reference signal $S_T$. The delays vary depending on the charge gradients $m_1$ and $m_2$, and the difference between the discharge times $\Delta t_1$ and $\Delta t_2$ represents the difference between the corresponding spark timings.

In more detail, the charge gradient $m_i$ of the wave form CD in FIG. 8 when the output Va of the integrating circuit 26 is greater than zero is controlled by the output Va of the integrating circuit 26 while the discharge gradient n is constant.

Here, $$m_i(T-\Delta t_i) = n \times \Delta t_i \quad (1)$$

where $m_i$ is $m_1$ when Va is zero, and $m_2$ when Va is positive, T is the period of the signal F and $\Delta t_i$ is the discharge time corresponding to the discharge gradient n, and is $\Delta t_1$ when Va is zero, and $\Delta t_2$ when Va is positive.

Transforming the expression (1), $$(\Delta t_i/T) = m_i/(m_i - n) \quad (2)$$

Since the delay angle $\theta_i = (\Delta t_i/T) \times \alpha \quad (3)$ where $\alpha$ is 120 degrees in the case of a 6-cylinder engine and 180 degrees in the case of a 4-cylinder engine, Substituting the expression (2) into (3), $$\theta_i = m_i/(m_i + n) \times \alpha \quad (4)$$

The expression (4) shows that the delay angle $\theta_i$ is a function of the charging gradient $m_i$.

Similarly, the second sub-circuit 284b has the same structure and function as sub-circuit 284a except that a diode $D_2$ of sub-circuit 284b is connected in the opposite polarity to that of diode $D_1$ of the sub-circuit 284a through a capacitor $C_4$ to the set input S of a flip-flop $FF_2$ of the circuit 284b such that the flip-flop $FF_2$ is set by the positive-going edge $F_1$ of the signal F from the duty factor control circuit 282. Thus, the trailing edges of the output pulses $CO_1$ and $CO_2$ of the circuits 284a and 284b are inputted through diode and capacitor pairs $D_3$, $C_5$; $D_4$, $C_6$ to the reset input R and set input S respectively of flip-flop 320 of the ignition controller 32 to produce a dwell angle signal, shown by ST″ in FIG. 8, delayed by a phase angle $\theta_2$ from the duty factor control circuit output F. This signal ST″ is supplied through an amplifier 322 and a power transistor 324 of the ignition controller 32 to the ignition coil 34. A current sensor 326 senses the current, as shown by $S_F$ in FIG. 8, flowing through the power transistor 324 to control the amplification factor of the amplifier 322 and thus control the current flowing through the power transistor 324. The current $S_F$ flowing through the power transistor 324 and the ignition coil 34 produces a spark at the spark plug, not shown, of the corresponding engine cylinder, also not shown, through the distributor 30 at the trailing edge of each of the current $S_F$ pulses.

Figure 9:
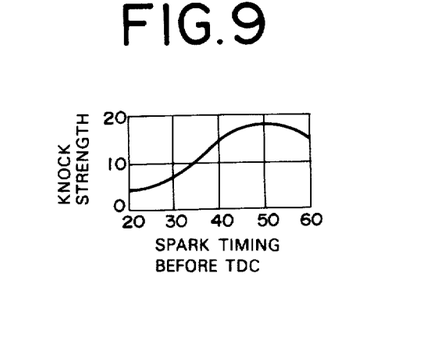
FIG. 9 is a graphical illustration of the relationship between spark timing and knocking strength.

The spark timing (the angle of the crankshaft before TDC) and the knocking strength have a relationship, as is shown in FIG. 9; the occurrence of knocking is restrained or avoided by retarding the spark timing.

The transistor $Tr_3$ and the resistor $R_7$ shown in the integrating circuit block 26, and an engine speed determining circuit 36 constitute a circuit for changing the response speed of the spark timing adjustment. The engine speed determining circuit 36 receives the spark signal $S_F$ from the ignition controller 32 and more particularly the amplifier 322 in FIG. 6 to calculate electrically the current engine speed to output a signal Sc which becomes high only when the engine speed is below a predetermined speed, for example 1,000 rpm. The engine speed determining circuit 36, as shown in FIG. 6, includes a monostable multivibrator 360 which receives the signal $S_F$ to output the corresponding rectangular pulse signal $S_F'$, a frequency to voltage converter 362 which converts the frequency of the signal $S_F'$ tothe corresponding voltage signal and a comparator 364 which compares the voltage signal with a predetermined reference level to output the signal $S_c$ when the engine speed is below a predetermined value.

Suppose now that the comparator 22 of the knocking sensing circuit 14 has generated a pulse signal Sp, and accordingly the output voltage Va of the integrating circuit 26 has risen to $V_1$, and the amount of retard angle DEL of the phase control circuit 28 has reached $\theta$, as shown in FIG. 5. At this time, when the engine speed N is higher than 1,000 rpm, for example, the output signal Sc of the engine speed determining circuit 36 is low and the transistor $Tr_3$ of the integrating circuit 26 is off. Consequently, the voltage across the capacitor $C_1$ of the integrating circuit 26 discharges relatively slowly with a discharge time constant $(R_2+R_4+R_5+R_6) \cdot C_1$ and, correspondingly, the output voltage Va decreases from $V_1$ with a gradient $\alpha$ while restraining the occurrence of further knocking, thereby controlling the spark timing signal ST″ and therefore the trailing edge of each pulse of the signal $S_F$, such that ignition is effected at the correct timing.

In contrast, when the engine speed falls below 1,000 rpm, the output Sc of the engine speed determining circuit 36 is high, so that the transistor $Tr_3$ is turned on. This short-circuits the resistor $R_5$ to change the discharge time constant of the capacitor $C_1$ from $(R_2+R_5+R_6+R_4)$ to $(R_2+R_4+R_6) \cdot C_1$. The output voltage Va of the integrating circuit 26 rapidly decreases with a gradient $\beta$ ($\beta > \alpha$) from the time $T_1$ when the engine speed N falls below 1,000 rpm, as shown in FIG. 5. The amount of retard angle DEL of the phase control circuit 28 also rapidly decreases with the same gradient $\beta$. This prevents the engine speed from falling below the idling speed, as shown by a broken line in FIG. 5, and hence the engine from stalling, which would occur if the amount of retard angle DEL continues to decrease with relatively small gradient $\alpha$ since the engine speed has become relatively low. This ensures that sparking is effected at normal timing as soon as possible after the idling operation is recovered.

Figure 10:
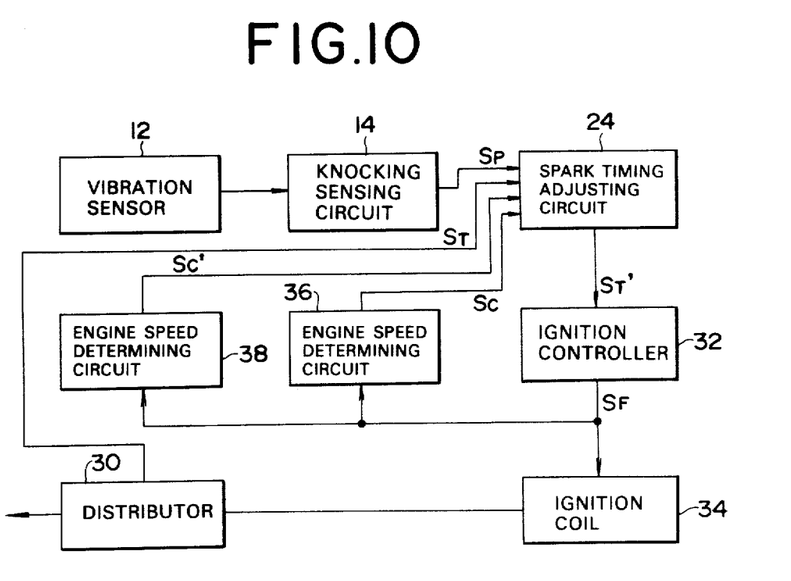
FIG. 10 is a second embodiment of the present invention.
Figure 11:
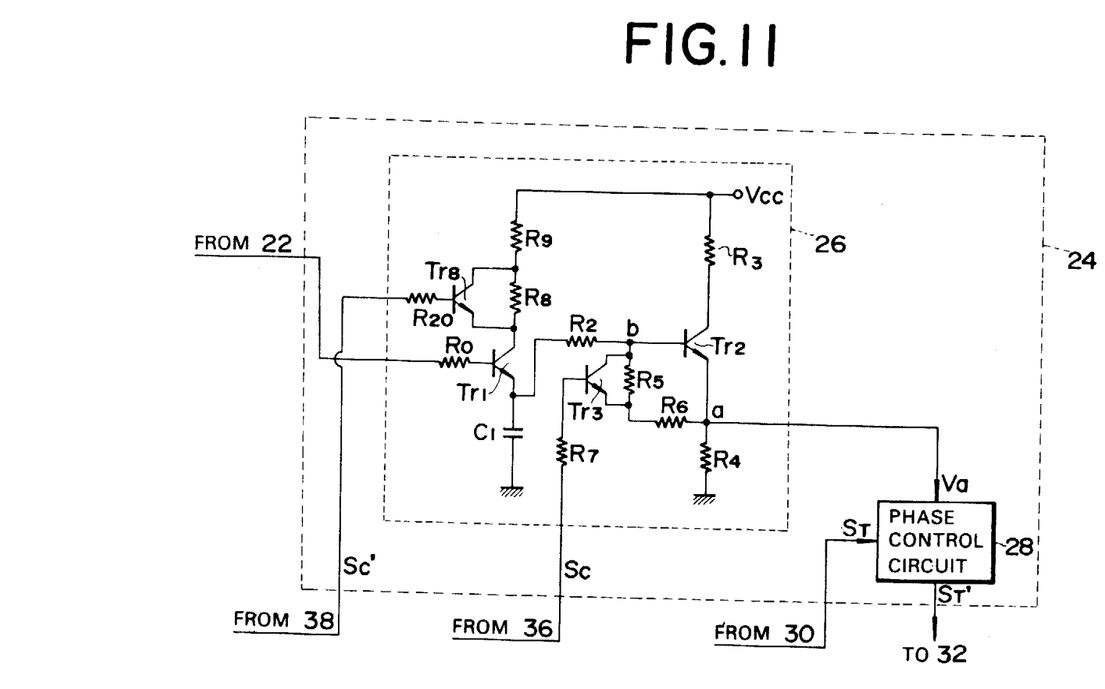
FIG. 11 is a circuit diagram of the spark timing adjusting circuit shown in FIG. 10.

FIGS. 10 and 11 show a second embodiment of the present invention which is the same as the FIG. 1 embodiment except that two series connected resistors $R_8$ and $R_9$ are used in place of the FIG. 1 resistor $R_1$, the sum of the resistances of $R_8$ and $R_9$ equalling the resistance of the resistor $R_1$. A control NPN transistor $Tr_8$ is provided whose collector and emitter are connected across the resistor $R_8$. The transistor $Tr_8$ is turned on through an input resistor $R_{20}$ by a high level signal Sc' from an operational state determining circuit such as a second engine speed determining circuit 38, thereby shortcircuiting the resistor $R_8$. The second engine speed determining circuit 38 receives the spark signal $S_F$ from the ignition controller 32 to determine the engine speed and as a result produces the signal Sc' when the engine speed is below a predetermined relatively high value, for example 2,000 rpm. Thus, the charge time constant of the capacitor $C_1$ of the integrating circuit 26, which determines the rate of control of the spark retard angle, is $(R_8+R_9) \cdot C_1$ when the engine speed is higher than 2,000 rpm, whereas it is $R_9 \cdot C_1$ when the engine speed is below 2,000 rpm, thereby giving a smaller charge time constant. This causes the spark timing to retard rapidly when the engine speed is below 2,000 rpm to reduce the occurrence of knocking. On the other hand, the speed of retardation of the spark timing when the engine speed is above 2,000 rpm is the same as that of FIG. 1. Accordingly, the speed of retardation of the spark timing is lower when the engine speed is higher than 2,000 rpm than when the engine speed is below 2,000 rpm. This does not retard the spark timing so rapidly that driving of the vehicle is not impaired even if knocking occurs when the engine speed is higher than 2,000 rpm and when the driving torque of the engine is relatively high.

Figures 12, 13:
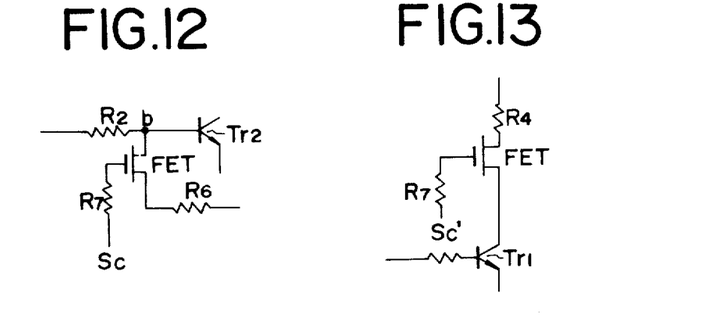
FIGS. 12 and 13 show alternatives to parts of the circuits of FIGS. 3 and 11.
Figures 14, 15:
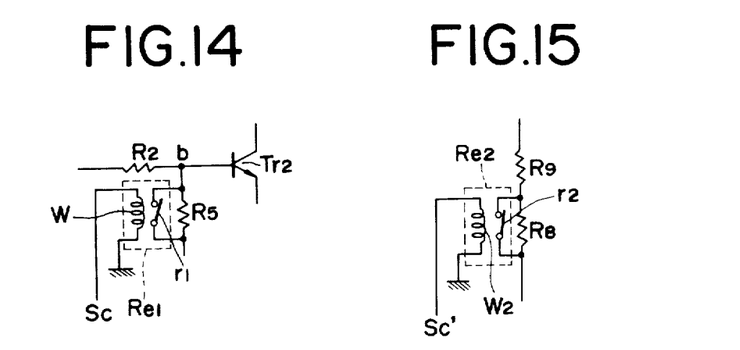
FIGS. 14 and 15 show other alternatives to parts of the circuits of FIGS. 3 and 11.

In the above embodiments, the response speed of adjusting the spark timing is shown as being changed in two steps, but may be changed in more steps. Alternatively, an electronically controlled resistance means such as a field effect transistor FET may be provided in place of resistor $R_5$, transistor $Tr_3$; resistor $R_8$, transistor $Tr_4$ in the integrating circuits 26, 26' to be controlled by the signals Sc and Sc' representing the operational state of the engine, as shown in FIGS. 12, 13. Relays $Re_1$ and $Re_2$ having normally open contacts $\gamma_1$ and $\gamma_2$, as shown in FIGS. 14 and 15, may be used in place of the transistors $Tr_3$ and $Tr_4$ in parallel with the resistors $R_5$ and $R_8$ respectively so that energization of the respective relay coils $W_1$ and $W_2$, is controlled by the signals Sc and Sc' representing the operational state of the engine.

Figure 16:
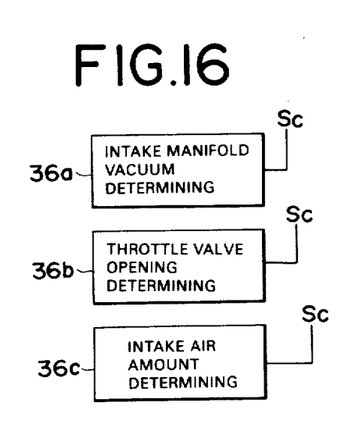
FIGS. 16 and 17 show alternatives to parts of FIGS. 7 and 10.
Figure 17:
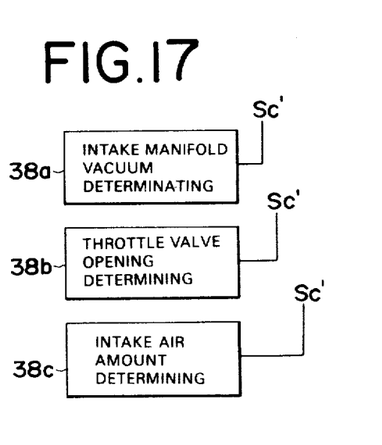

In the above embodiments, the spark timing system according to the present invention is shown as using a mechanical distributor which determines a basic spark timing, but it is not limited to this. The present invention is also applicable to a digital spark timing system using a microcomputer. The speed of adjusting of the spark timing may be changed according to other operational states such as intake manifold vacuum, the opening degree of a throttle valve or the amount of intake air to the engine; more particularly, as shown in FIGS. 16 and 17, intake manifold vacuum determining circuits 36a, 38a may be provided in place of the engine speed determining circuits 36, 38 which detect when the intake manifold vacuum is above predetermined relatively low and high values to produce operational signals Sc, Sc' for driving the transistors $Tr_3$, $Tr_8$ in FIGS. 3, 11; the FETs in FIGS. 12, 13; and the relays $Re_1$, $Re_2$ in FIGS. 14, 15, respectively. Alternatively, throttle valve opening determining circuits 36b, 38b may be provided in place of the engine speed determining circuits 36, 38, which detect that the opening degrees of a throttle valve are below predetermined relatively low and high values to produce operational signals Sc, Sc' for the same purpose. Alternatively, intake air amount determining circuits 36c, 38c may be provided in place of the engine speed determining circuits 36, 38 which detect that the amount of intake air into the engine is below predetermined relatively low and high values to produce operational signals Sc, Sc', respectively, for the same purpose.

A gate may be provided at the output of the wave shaper 18 of FIG. 2. The gate is closed for a fixed time period, for example 0.5 ms by a spark signal from the distributor 30 immediately after each ignition by the spark plugs in order to remove ignition noise which would be contained in the output signal $S_a$ from the band pass filter 16.

It will be understood by those skilled in the art that the foregoing description is made in terms of embodiments of the present invention wherein various changes and modifications may be made without departing from the spirit and scope of the invention, which is to be defined by the appended claims.

What is claimed is:

1. A spark timing system for a spark ignition internal combustion engine, comprising:
   (a) reference spark timing generating means for producing a basic spark timing signal;
   (b) knocking detecting means for sensing knocking occurring in said engine to generate a knocking signal representing the occurrence of the knocking;
   (c) spark timing adjusting means responsive to the knocking signal for adjusting the basic spark timing signal in the direction of retarding spark timing by an amount determined by a first rate of change in the presence of the knocking signal and for adjusting the basic spark timing signal in the direction of advancing spark timing by an amount determined by a second rate of change in the absence of the knocking; and
   (d) rate-changing means responsive to one of engine load and engine speed for increasing the second rate of change when said one of engine load and engine speed decreases below a first predetermined level.

2. The spark timing system as claimed in claim 1, in which said spark timing adjusting means includes a capacitor which is charged and discharged according to the presence or absence respectively of a knocking signal, and in which said rate changing means is adapted to perform the second rate of change by changing the discharge time constant of a circuit including said capacitor.

3. The spark timing system as claimed in claim 2, in which said spark timing adjusting means comprises a first resistance means determining the discharge time constant of said capacitor and said rate changing means includes a first switching means adapted to switch said first resistance means between at least two different resistance values in order to perform the second rate of change.

4. The spark timing system as claimed in claim 3, in which rate changing means includes a first engine operational state determining circuit responsive to said one of engine load and engine speed for producing a drive signal which causes said first switching means to switch said first resistance means to a lower resistance value when said one of engine load and engine speed decreases below said first relatively low predetermined level.

5. The spark timing system as claimed in claim 4, in which said first engine operational state determining circuit includes an engine speed determining circuit responsive to engine speed for producing said drive signal when the engine speed is below a predetermined relatively low value.

6. The spark timing system as claimed in claim 4, in which said first engine operational state predetermining circuit includes an intake manifold vacuum determining circuit responsive to intake manifold vacuum value for producing the drive signal when the intake manifold vacuum value is above a predetermined relatively high value.

7. The spark timing system as claimed in claim 4, in which said first engine operational state determining circuit includes a throttle valve opening determining circuit responsive to throttle valve opening for producing the drive signal when the throttle valve opening is below a predetermined relatively low value.

8. The spark timing system as claimed in claim 4, in which said first engine operational state determining circuit includes an intake air amount determining circuit responsive to intake air quantity for producing the drive signal when the intake air amount to said engine is below a predetermined relatively low value.

9. The spark timing system as claimed in any one of claims 4 to 8, in which said first switching means comprises a first transistor.

10. The spark timing system as claimed in any one of claims 4 to 8, in which said first switching means comprises a first relay.

11. The spark timing system as claimed in any one of claims 2 to 8, in which said rate changing means is adapted further to perform said first rate of change by changing the charge time constant of a circuit including said capacitor.

12. The spark timing system as claimed in claim 11 in which said spark timing adjusting means further comprises a second resistance means determining the charge time constant of said capacitor and said rate changing means includes a second switching means adapted to switch said second resistance means between at least two different resistance values in orer to perform said first rate of change.

13. The spark timing system as claimed in claim 12, in which said rate changing means includes a second engine operational state determining circuit responsive to one of said engine load and engine speed for producing a second drive signal which causes said second switching means to switch said second resistance means to a lower resistance value when said one of said engine load and engine speed is below a second predetermined level higher than said first predetermined level.

14. The spark timing system as claimed in claim 13, in which said second engine operational state determining circuit includes an engine speed determining circuit responsive to engine speed for producing the second drive signal when the engine speed is above a predetermined relatively high value.

15. The spark timing system as claimed in claim 13, in which said second engine operational state determining circuit includes an intake manifold vacuum determining circuit responsive to intake manifold vacuum for producing the second drive signal when the intake manifold vacuum value is below a predetermined relatively high value.

16. The spark timing system as claimed in claim 13, in which said second engine operational state determining circuit includes a throttle valve opening determining circuit responsive to throttle valve opening for producing the second drive signal when the throttle valve opening is above a predetermined relatively low value.

17. The spark timing system as claimed in claim 13, in which said second engine operational state determining circuit includes an intake air amount determining circuit responsive to intake air amounts for producing the second drive signal when the intake air amount into said engine is above a predetermined relatively low value.

18. The spark timing system as claimed in claim 13, in which said second switching means comprises a second transistor.

19. The spark timing system as claimed in claim 14, in which said second switching means comprises a second transistor.

20. The spark timing system as claimed in claim 15, in which said second switching means comprises a second transistor.

21. The spark timing system as claimed in claim 16, in which said second switching means comprises a second transistor.

22. The spark timing system as claimed in claim 17, in which said second transistor means comprises a second transistor.

23. The spark timing system as claimed in claim 13, in which said second switching means comprises a second relay.

24. The spark timing system as claimed in claim 14, in which said second switching means comprises a second relay.

25. The spark timing system as claimed in claim 15, in which said second switching means comprises a second relay.

26. The spark timing system as claimed in claim 16, in which said second switching means comprises a second relay.

27. The spark timing system as claimed in claim 17, in which said second switching means comprises a second relay.

28. The spark timing system as claimed in claim 2, in which said spark timing adjusting means comprises a first electronically controlled resistance means determining the discharge time constant of a circuit including said capacitor, and said rate changing means includes a first engine operational state determining circuit producing a signal to change the value of said electronically controlled resistance means when said engine operational state determining circuit detects that the engine speed decreases below a first predetermined level.

29. The spark timing system as claimed in claim 28, in which said spark timing adjusting means further comprises a second electronically controlled resistance means determining the charge time constant of a circuit including said capacitor, and said rate changing means includes a second engine operational state determining circuit responsive to one of engine load and engine speed for producing a signal to change the value of said second electronically controlled resistance means to a higher value when said second engine operational state determining circuit detects that said one of engine load and engine speed is above a second level higher than the first predetermined level.

30. The spark timing system of claim 1, wherein said rate-changing means also decreases the first rate of change when engine speed decreases below a first predetermined level.

31. The spark timing system of either claim 1 or 30, further comprising a second rate-changing means responsive to one of said engine load and engine speed for decreasing the first rate of change when said one of said engine load and engine speed increases to a second predetermined level significantly greater than the first level.

32. The spark timing system of claim 30, wherein said engine load is the intake air flow to said engine.

33. The spark timing system of claim 30, wherein said load is the extent of opening of a throttle valve.

34. The spark timing system of claim 30, wherein said load is intake manifold pressure.

35. In a spark timing system for a spark ignition combustion engine of the type comprising means for producing a basic spark timing signal and knocking detecting means for sensing the occurrence of knocking in said engine to produce a knocking signal representing the occurrence of the knocking, the improvement comprising:

spark timing adjusting means responsive to said knocking signal for adjusting said basic spark timing signal (a) to retard spark timing by an amount determined by a first rate of change in the presence of the knocking signal; and (b) to advance spark timing by an amount determined by a second rate of change in the absence of the knocking signal; and rate changing means for changing at least one of the first rate of change or the second rate of change in response to at least one of the engine load and engine speed only when said at least one of the engine load and engine speed decreases below a first predetermined value.

36. The spark timing system of claim 35, wherein said spark timing adjusting means includes a capacitor and means for charging the capacitor in response to the presence or absence of said knocking signal and said rate changing means includes switching means for changing the discharge time constant of said capacitor between at least two different discrete values, said switching means being responsive to one of said engine load and engine speed when either decreases to a first predetermined level.

37. The spark timing system as set forth in claim 36, wherein said switching means is further responsive to one of said engine load and engine speed decreasing to a second predetermined level higher than said first predetermined level.

* * * * *